United States Patent [19]

Endo

[11] Patent Number: 4,884,195
[45] Date of Patent: Nov. 28, 1989

[54] MULTIPROCESSOR SYSTEM FOR LOADING MICROPROGRAMS INTO A RAM CONTROL STORE OF A BUS CONTROLLER

[75] Inventor: Norikazu Endo, Hadano, Japan

[73] Assignee: Hitachi, Ltd., Tokyo, Japan

[21] Appl. No.: 895,438

[22] Filed: Aug. 11, 1986

[30] Foreign Application Priority Data

Aug. 30, 1985 [JP] Japan .................................. 60-189565

[51] Int. Cl.⁴ .......................... G06F 9/06; G06F 9/24; G06F 13/10; G06F 13/14
[52] U.S. Cl. .................. 364/200; 364/926.9; 364/931.4; 364/230.0; 364/238.3; 364/240.5; 364/244.6; 364/262.8
[58] Field of Search ... 364/200 MS File, 900 MS File

[56] References Cited

U.S. PATENT DOCUMENTS

| | | | |
|---|---|---|---|
| 4,228,496 | 10/1980 | Katzman et al. | 364/200 |
| 4,363,093 | 12/1982 | Davis et al. | 364/200 |
| 4,365,294 | 12/1982 | Stokken | 364/200 |
| 4,376,973 | 3/1983 | Chivers | 364/200 |
| 4,514,806 | 4/1985 | Hartig | 364/200 |
| 4,543,642 | 9/1985 | Hansen | 364/900 |

FOREIGN PATENT DOCUMENTS

| | | | |
|---|---|---|---|
| 58-3015 | 1/1983 | Japan | 364/200 |
| 58-54424 | 3/1983 | Japan | 364/200 |
| 58-112118 | 7/1983 | Japan | 364/200 |

Primary Examiner—Archie E. Williams, Jr.
Assistant Examiner—Ayni Mohamed
Attorney, Agent, or Firm—Antonelli, Terry & Wands

[57] ABSTRACT

In a multiprocessor system having a plurality of independent modules including a processor and a memory where the modules are connected via a common transmission path, a transmission control section for handling the interface with the transmission path between the modules is also equipped with a dedicated processor and controlled by its own microprogram. In accordance with the present invention, the memory for storing the microprogam therein is constituted by a writable memory, and the system is so configured that the microprogram may be loaded not only from the inside of the concerned module but also from another module through the common transmission path. Since the microprogram of the transmission control section can thus be loaded from two routes, the system can be configured or reconfigured with significant flexibility.

2 Claims, 5 Drawing Sheets

FIG. 5A

| 0 | 7 | 8 | 9 | 23 | 24 | 31 |
|---|---|---|---|---|---|---|
| DEVICE ADDRESS | | I | ADDRESS | | | |
| DATA | | | | | | |
| | | I | ADDRESS | | | |
| DEVICE ADDRESS | | I | ADDRESS | | | |
| DATA | | | | | | |
| DEVICE ADDRESS | | O | INSTRUCTION CODE | | | |

FIG. 5B

| 0 | 15 | 16 | 23 | 24 | 31 |
|---|---|---|---|---|---|
| BC NUMBER OF DESTINATION | | | | COMMAND | |
| BC NUMBER OF ORIGIN | | | | UPPER ADDRESS | |
| DATA | | | | LOWER ADDRESS | |
| DATA | | | | LOWER ADDRESS | |
| DATA | | | | LOWER ADDRESS | |
| BC NUMBER OF DESTINATION | | | | COMMAND | |
| BC NUMBER OF ORIGIN | | | | NUMBER OF DATA (0) | | ed
MULTIPROCESSOR SYSTEM FOR LOADING MICROPROGRAMS INTO A RAM CONTROL STORE OF A BUS CONTROLLER

BACKGROUND OF THE INVENTION

The present invention relates to a multiprocessor system in which a plurality of independent modules including a processor and a memory are connected via a common transmission path, and in particular to a system and method for loading microprogram onto a transmission controller which handles interface with the transmission path between modules.

The system in which a plurality of independent modules including a processor and a memory are connected via a common transmission path is found in fields such as packet exchanges, for example. Each module has the transmission controller which manages the interface with the transmission path, the input-output controller which manages the interface with the external input-output devices, and the communication controller which manages the interface with the external communication lines. The processor controls the entire module and is connected to the transmission controller, the input-output controller, the communication controller, and the like via the internal transmission path in the module. Each of the transmission controller, the input-output controller, and the communication controller usually has its own memory for storing the microprogram, and operates under the control of its individual microprogram.

The present invention is directed to the microprogram contained in the transmission controller. In the prior art, this microprogram was stored in the read only memory (ROM), and the memory was initialized at the time of power-on to activate the transmission controller. Since the memory was a ROM, however, the ROM had to be replaced to correct the specification alteration or logic fault in the microprogram when it occurred. The component cost and personnel labor for replacement of the component is significant.

Known techniques relating to the present invention are disclosed in JP-A-No. 58-112118, JP-A-No. 58-54424 and JP-A-No. 58-3015, for example.

SUMMARY OF THE INVENTION

An object of the present invention is to use a writable memory (RAM) as the memory storing the microprogram for controlling the transmission controller of the above described multiprocessor system.

Another object of the present invention is to make possible microprogram loading in any system configuration by using the RAM memory.

The multiprocessor system according to the present invention has the configuration listed below.

(1) A module including:
 (a) a first processor for carrying out arithmetic processing and peripheral control;
 (b) a first memory storing the program and data for controlling the first processor;
 (c) an input-output controller controlled by the first processor to control external input-output devices;
 (d) a transmission controller controlled by the first processor so as to effect the information transfer from/to another module and composed of (i) a second processor for effecting computation processing, and
 (ii) a second memory writable to store the microprogram for controlling the second processor; and
 (e) a first common transmission path for connecting the first processor, the first memory, the input-output controller, and the transmission controller to transfer information among them; and
(2) A second common transmission path for connecting the transmission controllers of different modules to transfer information between two modules via the transmission controllers.

In accordance with the present invention, a circuit connected to the first transmission path and the second memory is so disposed in the transmission controller that in the initial state after power-on sequence the transmission controller may store the microprogram transferred through the first transmission path into the second memory under the control of the first processor.

Further in accordance with the present invention, a circuit connected to the second transmission path and the second memory is so disposed in the transmission controller that the transmission controller may store the microprogram transferred through the second transmission path in the initial state following the power-on sequence into the second memory after the identification code of the concerned module transferred ahead of the microprogram has been recognized.

Further in accordance with the present invention, means for selecting the microprogram yielded from either of the above described two kinds of circuits to send it to the second memory is disposed in the transmission controller of the multiprocessor system.

Further in accordance with the present invention, the microprogram loading method includes the step of storing, under the control of the first processor, the microprogram transferred to the transmission controller (the first transmission controller) of the first module assuming the initial state following the power-on sequence through the first transmission path into the second memory, the step of starting up, under the control of the first processor, the second processor of the first module, and the step of storing, under the control of the first processor, the microprogram transferred from the first memory to the transmission controller (the second transmission controller) of the second module assuming the initial state following the power-on sequence through the first transmission path, the first transmission controller and the second transmission path into the second memory of the second transmission controller.

BRIEF DESCRIPTION OF THE DRAWINGS

FIG. 5A shows the format of information sent to the bus controller via a CPU bus. FIG. 5B shows the format of information sent to the bus controller via the high rank bus.

DESCRIPTION OF THE PREFERRED EMBODIMENTS

Figure 1:
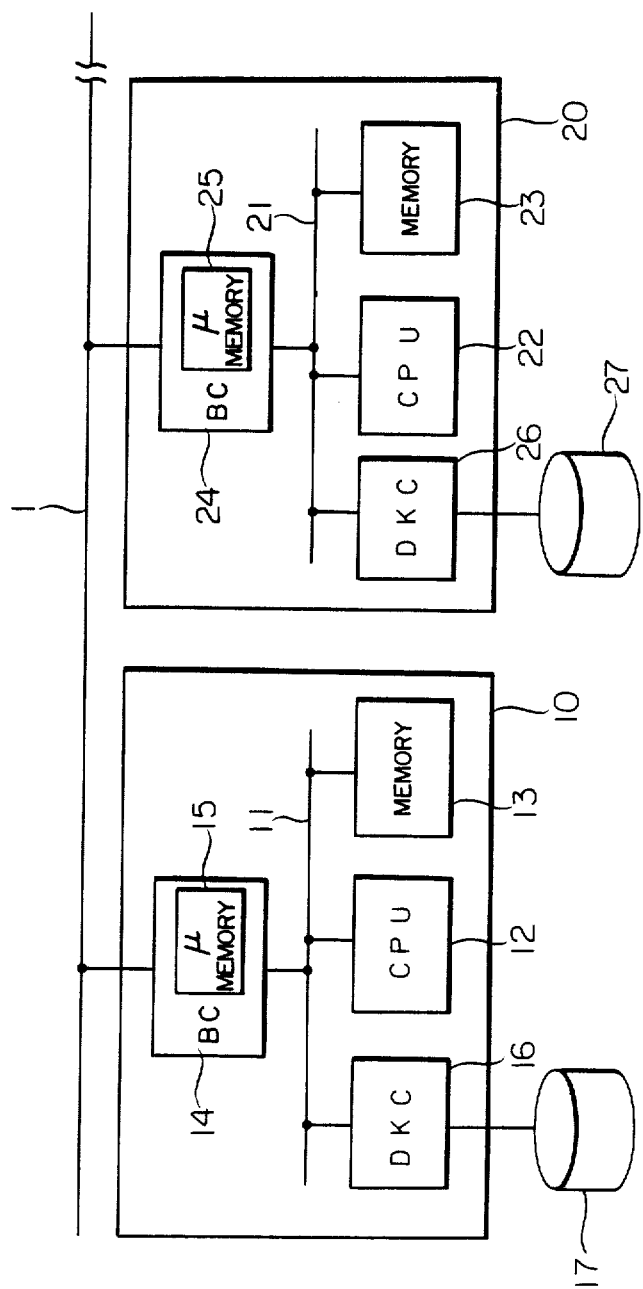
FIG. 1 is a configuration diagram of a multiprocessor system in which a plurality of modules are connected via a high rank bus.

An embodiment of the present invention will now be described by referring to the drawings.

FIG. 1 is a configuration diagram of a multiprocessor system in which a plurality of modules 10 and 20 respectively including processors 12 and 22 as well as memories 13 and 23 are connected via a high rank bus 1. Disk storages 7 and 27 store program loaded into the memories 13 and 23 and used by the processors 12 and 22, respectively. Numerals 16 and 26 denote disk control units. Bus controllers 14 and 24 conduct the information transfer between the modules via the high rank bus 1. Memories 15 and 25 store the microprogram for controlling the bus controllers 14 and 24, respectively. A CPU bus 11 is used to connect the processor 12, the memory 13, the bus controller 14, and the disk control unit 16. A CPU bus 21 is used to connect the processor 22, the memory 23, the bus controller 24, and the disk control unit 26. The disk storages and the disk control units need only be present in at least one module. They may be absent in some modules.

Operation for loading the program onto the memories 13 and 23 will now be described by referring to FIG. 1. When the processor 12 is started from the outside, a loader composed of ROM contained in the processor 12 operates to load the control program for processor 12 stored in the disk storage 17 into the memory 13 via the CPU bus 11 and the disk control unit 16. When the loading has been completed, the control is transferred to the control program stored in the memory 13 and the processor 12 starts its operation. If the disk storage 27 and the disk control unit 26 are not present in the module 20, the processor 12 which has thus been activated takes the program for processor 22 out of the disk storage 17 through the CPU bus 11 and the disk control unit 16. After storing the program once in the memory 13 and then storing it into the memory 23 via the CPU bus 11, bus controller 14, the high rank bus 1, bus controller 24 and CPU bus 21, the processor 12 starts the processor 22.

As a precondition for the above described operation, the bus controllers 14 and 24 must have already been activated and must be ready to operate correctly.

Figure 2:
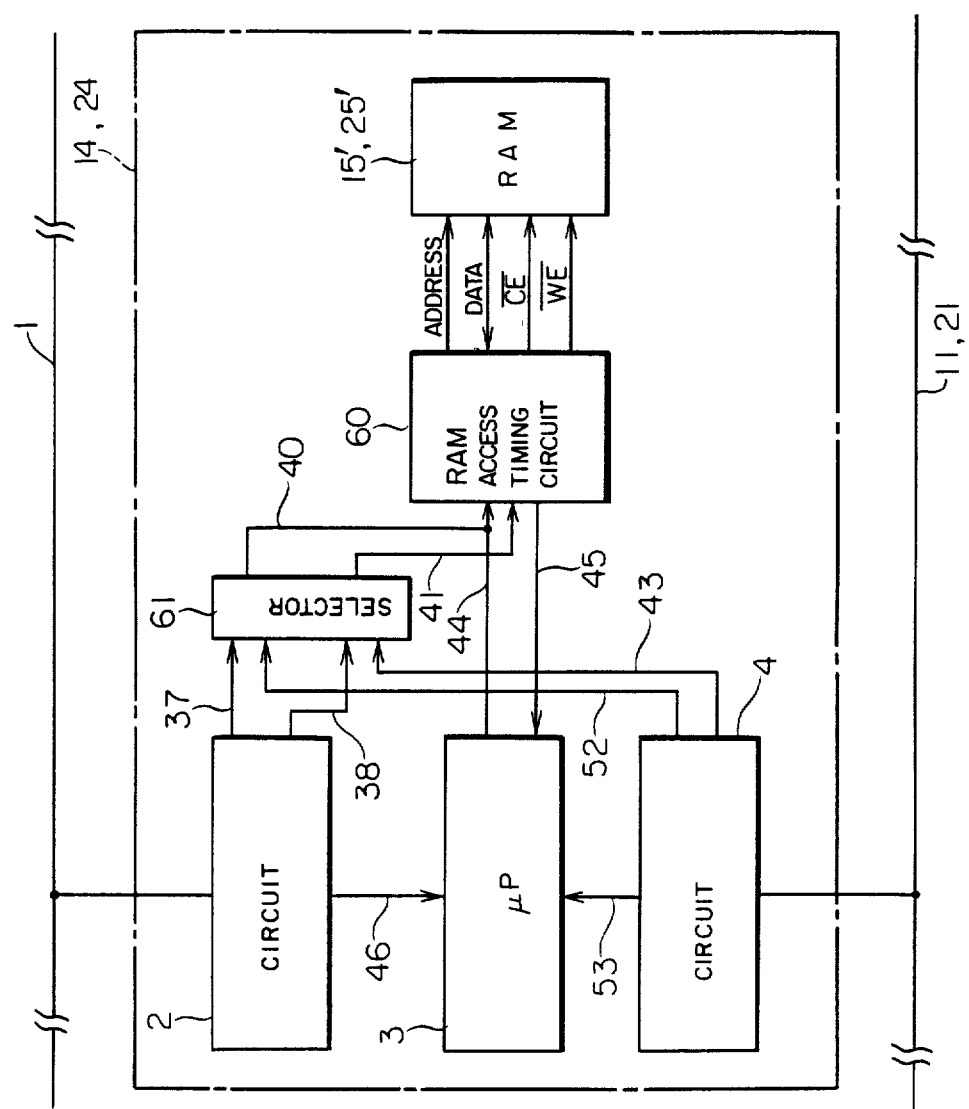
FIG. 2 is a schematic configuration diagram of a bus controller which is an embodiment of the present invention.

FIG. 2 is a configuration diagram showing the internal configuration of the bus controllers 14 and 24. The internal configuration of the bus controller 14 will now be described. The function of the bus controller 24 is the very same as that of the bus controller 14 excepting that reference numerals 15' and 11 are replaced by 25' and 21, respectively. A microprocessor 3 controls the whole of the bus controller 14 and has a readable and writable memory for its exclusive use which is not illustrated. A RAM 15' stores the microprogram therein. A wired-logic circuit 2 sends the data transmitted from another module via the high rank bus 1 to the microprocessor 3 or stores the microprogram into the RAM 15' A wired-logic circuit 4 sends the data transmitted from the processor 12 of its own module via the CPU bus 11 to the microprocessor 3 or stores the microprogram into the RAM 15'. A signal line 40 is used to supply the address and control to the RAM 15'. A signal line 44 is used by the microprocessor 3 to supply the address to the RAM 15'. A signal line 45 is used to read data out of the RAM 15'. A signal line 41 is used to write data into the RAM 15'. A circuit 60 disposed between the signal lines 40, 41, 44 and 45 and the RAM 15' supplies operation timing signals to the RAM 15' Output lines of the circuit 60 are connected to the RAM 15' to supply the address information, data and control information such as CE (Chip Enable) and WE (Write Enable) to the RAM 15' Signal lines 37 and 52 supply the address and control to the circuit 60 via the signal line 40. Signal lines 38 and 43 are used to supply data to the circuit 60 via the signal line 41. A selector 61 is used to select either of the signal lines 37 and 52 and select either of the signal lines 38 and 43. A signal line 46 is used by the circuit 2 to supply the data and control to the microprocessor 3. A signal line 53 is used by the circuit 4 to supply the data and control to the microprocessor 3.

Figure 3:
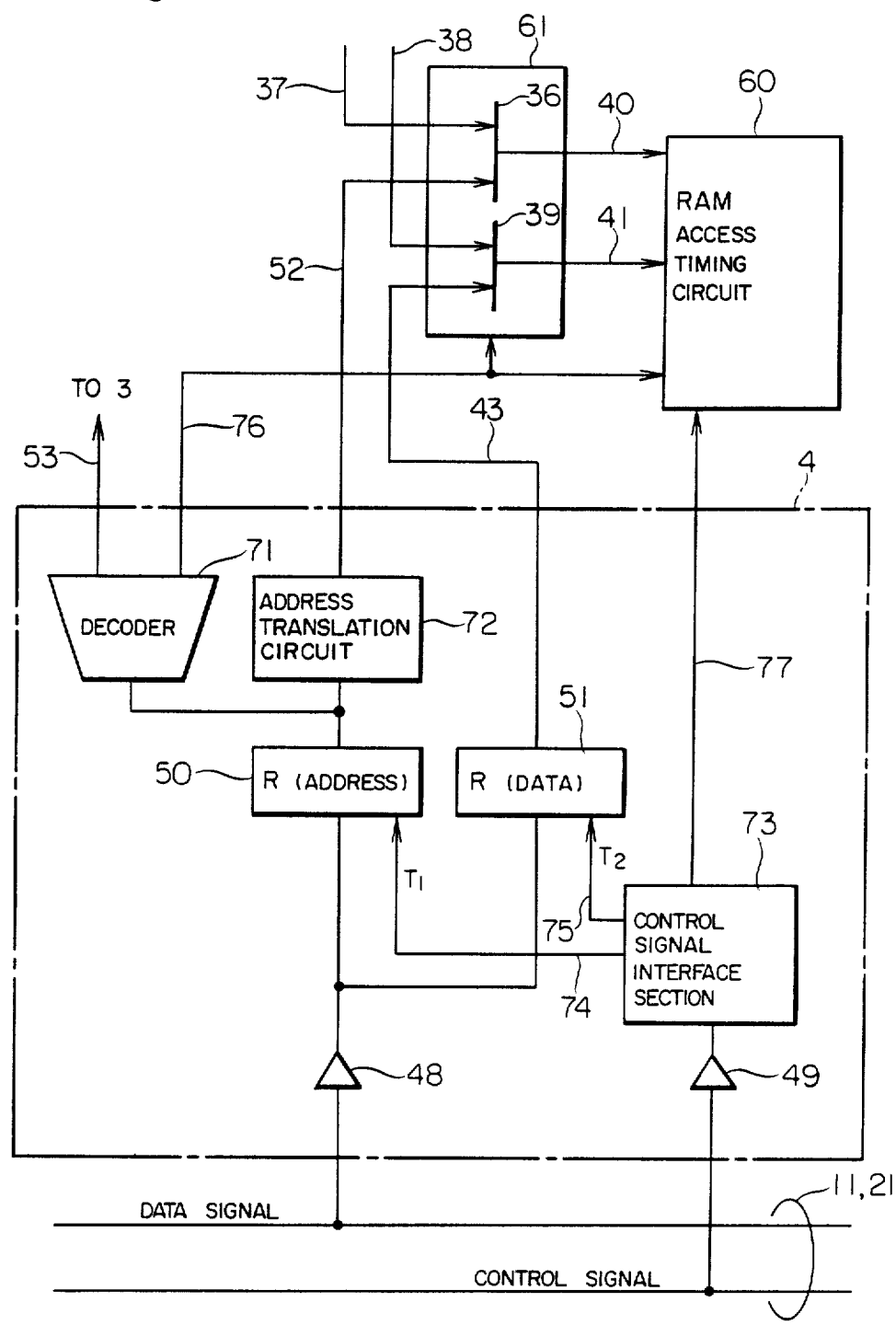
FIG. 3 is a block diagram mainly showing the internal configuration of a circuit 4 included in the bus controller.

FIG. 3 is a block diagram mainly showing the internal configuration of the circuit 4. Reference numerals 48 and 49 denote receivers. A 32-bit register 50 latches the address part of the information transmitted through the CPU buses 11 and 21. A 32-bit register 51 latches the data part of the information transmitted through the CPU buses 11 and 21. On the basis of a control signal received from the CPU buses 11 and 21, a control signal interface section 73 supplies a timing signal $T_1$ to the register 50 through a signal line 74 to latch the address part into the register 50 and supplies a timing signal $T_2$ to the register 51 through a signal line 75 to latch the data part into the register 51. The control signal interface section 73 also supplies data write timing signal to the circuit 60 through a signal line 77. An address translation circuit 72 translates the address stored in the register 50 into the address of the RAM 15'. A decoder 71 interprets the address information stored in the register 50. If it represents the loading address of the microprogram with respect to the concerned bus controller 14, the decoder 71 sends a data write request signal to the circuit 60 via the signal line 76. If the information stored in the register 50 is an instruction for starting the microprocessor 3 with respect to the concerned bus controller 14, the decoder 71 starts the microprocessor 3 via a signal line 53. A selector 61 is composed of a selector 36 and a selector 39. The selector 36 selects either of signal lines 37 and 52 which receives a request earlier and the selector 39 selects either of signal lines 38 and 43 which receives a request earlier. When a request signal is supplied from the decoder 71 through a signal line 76, the signal lines 52 and 43 are selected. After the microprocessor 3 has been started, the information latched in the registers 50 and 51 via the CPU buses 11 and 21 is transferred to the microprocessor 3 which is not illustrated in FIG. 3.

Figure 4:
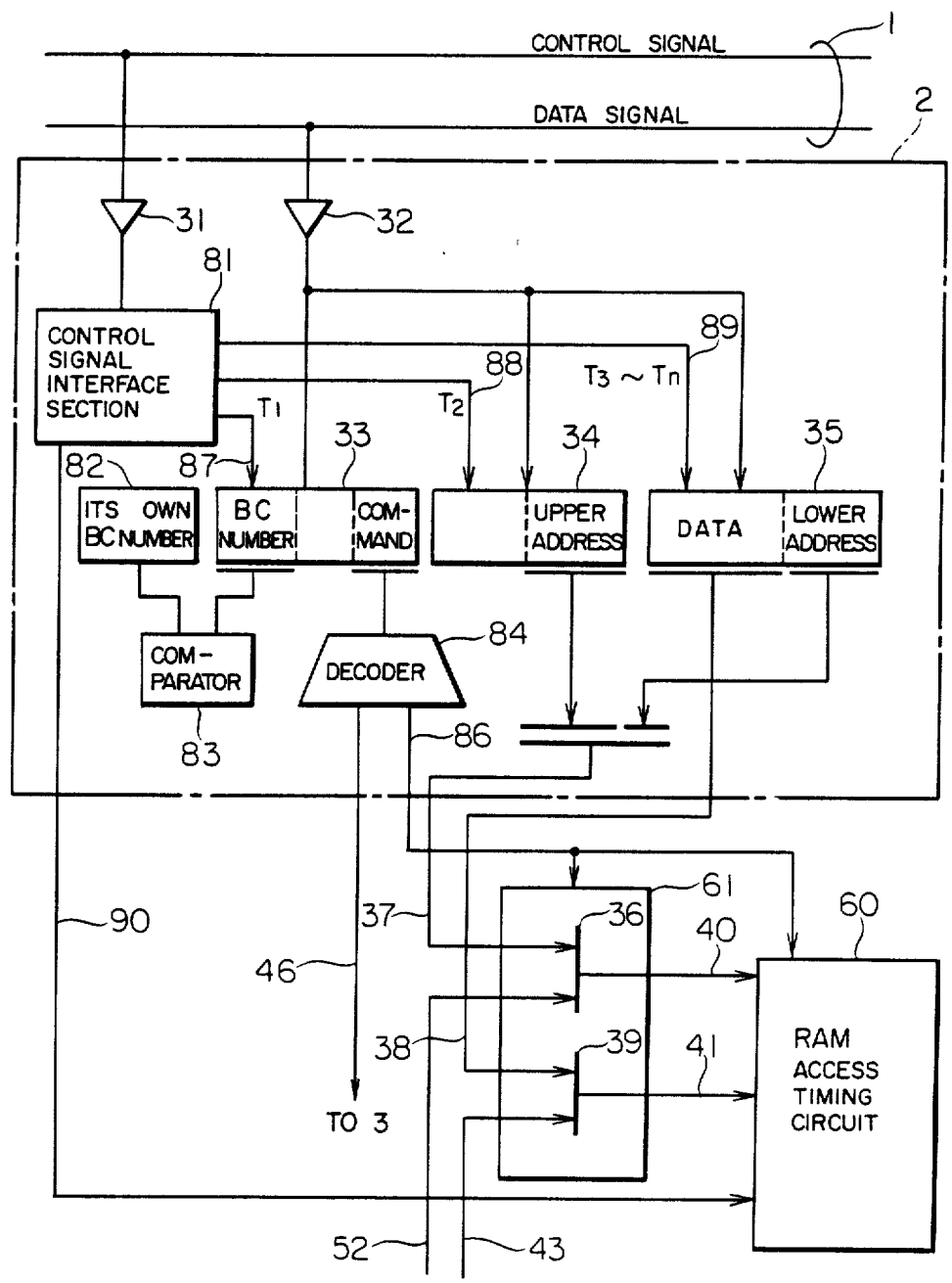
FIG. 4 is a block diagram mainly showing the internal configuration of a circuit 2 included in the bus controller.

FIG. 4 is a block diagram mainly showing the internal configuration of the circuit 2. Reference numerals 31 and 32 denote receivers. Registers 33, 34 and 35 are respectively 32 bits in length and latch the information transmitted through the high rank bus 1. A control signal interface section 81 receives a control signal from the high rank bus 1 and supplies a timing signal $T_1$ to the register 33 through a signal line 87 to latch the information received from the high rank bus 1 therein. The control signal interface section 81 supplies a timing signal $T_2$ to the register 34 through a signal line 88 to latch the information received from the high rank bus 1 therein and supplies timing signals $T_3, T_4, \ldots T_n$ to the register 35 through a signal line 89 to latch the information received from the high rank bus 1 therein. The control signal interface section 81 also supplies a data write timing signal to the circuit 60 through a signal line 90. A register 82 stores the number of its own bus controller therein. A comparator 83 compares the contents of the register 82 with the bus controller number (BC number) which is an upper part of the information stored in the register 33. A decoder 84 interprets a command code which is a lower part of the information stored in the register 33. If the command code commands microprogram loading with respect to this bus controller 14, the decoder 84 controls the selectors 36 and 39 via a signal line 86 so that the signal lines 37 and 38 will be selected and sends a data write request signal to the circuit 60. If the command code in the register 33 commands to start the microprocessor 3, the decoder 84 starts the microprocessor 3 via the signal line 46. The information latched in the registers 33, 34 and 35 via the high rank bus 1 after the microprocessor 3 has been started is transferred to the microprocessor 3 via the signal line 46, although it is not illustrated in FIG. 4.

FIG. 5A shows the format of information sent to the bus controllers 14 and 24 through the CPU buses 11 and 21. Each of the CPU buses 11 and 21 includes 32 data wires which carry 32 bits of information in parallel. The first 32-bit information is address information, and bits 0 to 7 represent the device address 101 of the bus controller 14 or 24. Bit 8 is a flag 102. Flag "1" represents the instruction for loading the microprogram. Bits 9 to 23 constitute an address part 103. Bits 0 to 23 within the following 32 bits carry the data information 104 which is stored in the register 51 by the timing signal $T_2$. That is to say, the data width of the RAM 15' and RAM 25' is 3 bytes (24 bits) in this embodiment. In this way, the address 103 and data 104 are alternately transmitted on the CPU buses 11 and 21. It is also possible to transfer the address 103 and data 104 in parallel through the CPU buses 11 and 21. The last 32-bit information of FIG. 5A has flag "0" in bit 8 (numeral 102) and is an instruction for starting the microprocessor 3.

FIG. 5B shows the format of the information sent to the bus controllers 14 and 24 through the high rank bus 1. The high rank bus 1 includes 32 data wires, which carry 32 bits of information in parallel. The information of the first 32 bits includes the BC number of the destination 106 and a command 107. This command 107 commands microprogram loading. The information of the following 32 bits includes the BC number of the origin 108 and the upper address 109 of the RAM 15' or 25'. It is followed by the microprogram as data 110 and a lower address 111. The upper address 109 and the lower address 111 are joined to form the full address of the RAM 15' or 25'. The information of the last two words shown in FIG. 5B is a command for starting the microprocessor 3. The lower address is not necessarily required. Alternatively, only the starting address may be supplied at the beginning and stored in the register 34. And the output of the register 34 may be supplied to an address increment circuit to produce one full address after another on the signal line 37. In this case, the increment circuit may be disposed between the register 34 and the signal line 37 of FIG. 4.

On the basis of FIGS. 1 through 5B, the operation of the present embodiment will now be described in due order. First, the operation for loading the control program for the processor 12 into the memory 13 has been already described in the foregoing.

Then, the operation for storing the microprogram whereby the bus controller 14 is controlled will now be described. The processor 12 is so controlled by the control program loaded into the memory 13 as to operate to temporarily write the microprogram stored in the disk storage 17 into the memory 13. When the write operation has been completed, the processor 12 reads out this microprogram from the memory 13 and sends it to the bus controller 14 through a register which is included in the processor 12 and which is not illustrated and through the CPU bus 11. The information transfer between the disk control unit 16 and the memory 13 can be uniformly handled by the information format shown in FIG. 5A in the same way as the information transfer between the disk control unit 16 and the bus controller 14. If the processor 12 supplies a special command to the disk control unit 16, therefore, the microprogram can also be directly transferred from the disk control unit 16 to the bus controller 14 (without passing it through the processor 12 and the memory 13). Such a system raises the speed of the microprogram loading. When the control signal interface section 73 of the circuit 4 of the bus controller 14 which is in the initial state following the power application receives a control signal indicating the presence of the information transfer on the CPU bus 11, the circuit 4 stores the address information into its register 50 upon occurrence of the timing signal $T_1$ and stores the data information into its register 51 upon occurrence of the timing signal $T_2$. When the decoder 71 has recognized the microprogram loading instruction with respect to its own bus controller 14 on the basis of the device address information 101 of bits 0 to 7 and the flag 102 of bit 8 stored in the register 50, the decoder 71 sends the request signal to the selector 61 via the signal line 76 to select the signal lines 52 and 43 and start the circuit 60. The control signal interface section 73 supplies the timing signal for data writing to the circuit 60 through the signal line 77. The address information 103 of bits 9 to 23 stored in the register 50 undergoes address translation in the address translation circuit 72 and is supplied to the RAM 15' through the signal line 52, the signal line 40 and the circuit 60. When the address space of the RAM 15' accessed from the processor 12 is different from that accessed from the microprocessor 3, adequate address translation must thus be conducted in the circuit 4. (In an example of the simplest address translation, only the lower bit part of the address information is taken out as the new address.) On the other hand, the data stored in the register 51, i.e., the microprogram is written into the RAM 15' via the signal lines 43 and 41 and the circuit 60. After the completion of wirting the microprogram into the RAM 15', the processor 12 sends the start instruction as shown in FIG. 5A toward the CPU bus 11. This instruction is stored in the register 50. When the decoder 71 recognizes this instruction, it sends the start signal to the microprocessor 3 through the signal line 53 and stops starting the circuit 60 via the signal line 76. Thus the microprocessor 3 is ready for operation.

The operation carried out when the processor 12 stores the microprogram into the memory 25' included in the bus controller 24 of another module 20 will now be described. At first, the processor 12 is so controlled by the control program loaded into the memory 13 as to write the microprogram stored in the disk storage 17 into the memory 13 temporarily. When this writing operation has been completed, the processor 12 adds the destination BC number 106, the command 107 for commanding the microprogram loading and the like as shown in FIG. 5B to the top of the micro-program. The processor 12 sends the instruction accompanied by the address of the storage area of this microprogram to the bus controller 14. This instruction code arrives at the microprocessor 3 via the CPU bus 11, the circuit 4 and the signal line 53. The microprocessor 3 reads out the microprogram of the another module having the format of FIG. 5B from the storage area of the memory 13 and sends the microprogram thus read out onto the high rank bus 1. It is now assumed that the bus controller 24 of the module 20 is in its initial state following the power-on sequence. When the control signal interface section 81 of the circuit 2 of that module has received the control signal indicating the presence of information transfer, on the high rank bus 1, the BC number of destination 106 and the command 107 are stored into the register 33 at the timing $T_1$, and the BC number of origin 108 and the upper address 109 are stored into the register 34 at the timing $T_2$. And the succeeding data 110 and the lower address 111 are stored into the register 35 at the timing $T_3$ - $T_n$. When the BC number of destination 106 stored in the register 33 is equal to its own BC number stored in the register 82 as a result, of comparison in the comparator 83, the command code 107 stored in the register 33 is interpreted by the decoder 84. If this command 107 is recognized as the command commanding microprogram loading, the selection request signal is sent to the selector 61 through the signal line 86 to select the signal lines 37 and 38 and start the circuit 60. The control signal interface section 81 supplies the data writing timing signal to the circuit 60 through the signal line 90. The upper address 109 stored in bits 16 to 31 of the register 34 are joined to the lower address 111 stored in bits 24 to 31 of the register 35 to form the full address of the RAM 25'. The resultant full address is supplied to the RAM 25' via the signal lines 37 and 40 and the circuit 60. On the other hand, the data stored in bits 0 to 23 of the register 35, i.e., the microprogram is written into the RAM 25' via the signal lines 38 and 41 and the circuit 60. When the transfer of the microprogram through the high rank bus 1 has thus been completed, the control signal interface section 81 senses the change in control signal and stops driving the circuit 60 via the signal line 90. Writing the microprogram into the RAM 25' has thus been completed. The processor 12 prepares the start command for the bus controller 24 in the module 20 as represented by the last two words of FIG. 5B on the memory 13 while regarding the bus controller 24 in the module 20 on the memory 13. And the processor 12 sends the instruction accompanied by the address of this start command to the bus controller 14. This instruction code arrives at the microprocessor 3 via the CPU bus 11, the circuit 4 and the signal line 53. The microprocessor 3 reads out the aforementioned start command from the storage area on the memory 13 and sends it onto the high rank bus 1. When the control signal interface section 81 of the circuit 2 in the bus controller 24 has received the control signal indicating the presence of information transfer on the high rank bus 1, the BC number of destination 106 and the command 107 are stored into the register 33 at the timing $T_1$, and the BC number of origin 108 and the number of data (0)112 are stored into the register 34. When the BC number of destination 106 stored in the register 33 is equal to its own BC number in the register 82, the decoder 84 is energized. When the decoder 84 has recognized the command 107 of bits 24 to 31 stored in the register 33 as the start command, the start signal is sent to the microprocessor 3 through the signal line 46. The microprocessor 3 becomes thus ready for operation.

After the bus controller 24 becomes ready for operation as described above, the control program for processor 22 is loaded into the memory 23 via the high rank bus 1. This operation will now be described. The processor 12 is so controlled as to operate to temporarily write the control program for processor 22 stored in the disk storage 17 into the memory 13. When the writing operation has been completed, the processor 12 adds the bus controller number of the other module, the command 107 for commanding the program loading, and the like to the top of the control program, and sends the instruction accompanied by the address of the storage area of the control program to the bus controller 14. This instruction is supplied to the microprocessor 3 through the CPU bus 11, the circuit 4 and the signal line 53. The microprocessor 3 reads out the control program from the related storage area on the memory 13 and sends the control program thus read out onto the high rank bus 1. The circuit 2 in the bus controller 24 recognizes its own bus controller identification number and successively stores its control program into the register 35. The command stored in the register 33 is interpreted by the decoder 84 and the signal line 46 is selected. And the command and the control program are sent to the microprocessor 3. After the microprocessor 3 temporarily stores the control program into its own memory, the microprocessor 3 translates the control program into the information having the format of FIG. 5A and then writes the resultant information directly into the memory 23 by using the direct memory access function. After the control program has been written into the memory 23, the processor 12 specifies the module 20 and sends the command for starting the processor 22 to the module 20. The command is brought into the microprocessor 3 via the bus controller 14, the high rank bus 1 and the circuit 2 of the bus controller 24. The processor 22 is thus started from the microprocessor 3.

The above described configuration and operation will now be summarized. By using the present invention, microprogram loading becomes possible in any system configuration. This point will now be described at first.

It is now assumed that the module 10 has the same configuration as that of the module 20 and that the disk storages 17 and 27 as well as the disk control units 16 and 26 are respectively connected to the modules. Such system configuration is used in the duplex system form in which one module 10 serves as the online system and the other module 20 serves as the stand-by system. In such system configuration, the bus controller 14 within the online system is activated via the CPU bus 11 and the circuit 4. If a machine failure should occur in the online systems, the module 20 designated to the stand-by system operates instead of the online system. When the module 10 has been recovered from the failure to its normal state, the module 20 is capable of operating to activate the bus controller 14 via the high rank bus 1 and the circuit 2.

It is now assumed that the disk storage 17 and the disk control unit 16 are connected to only one module 10. And it is also assumed now that all of other modules such as the module 20 serve as the online system, but the disk storage 27 and the disk control unit 26 are not connected to those modules. In this case, the bus controller 14 of the module 10 is activated via the CPU bus 11 and the circuit 4. In other modules, however, the bus controller 24 and the like can be activated via the high rank bus 1 and the circuit 2.

In all of the above described system structures, it is a matter of course that bus controllers in all modules may have identical structure.

In accordance with the present invention, the memory in which the microprogram for controlling the bus controller is stored is constituted by the RAM as described above. In addition, wired-logic circuits are added to receive the microprogram from both the CPU bus and the high rank bus and transfer the microprogram to the RAM. This results in a effect that the microprogram loading becomes possible in any system configuration.

I claim:

1. A multiprocessor system including:
   at least two modules wherein each module includes,
   (a) a first processor for executing arithmetic processing and peripheral control,
   (b) a first memory for storing program and data wherein said program and data controls said first processor,
   (c) an input-output controller controlled by said first processor wherein said input-output controller controls external input-output devices,
   (d) a transmission controller controlled by said first processor wherein said transmission controller controls information transfers from/to another module, and
   (e) a first common transmission path connected to said first processor, said first memory, said input-output controller and said transmission controller for permitting information transfers between said first processor, said first memory, said input-output controller and said transmission controller; and
   a second common transmission path respectively connected to transmission controllers of said modules for permitting information transfers between said modules via said transmission controllers,
   said transmission controller includes
   a second processor for executing arithmetic processing,
   a second memory for storing microgprogram wherein said microprogram controls said second processor, said second memory being writable,
   a first circuit connected to said first common transmission path and said second memory, said first circuit being controlled, in an initial state following a power-on sequence, by said first processor such that microprogram, transferred through said first transmission path, is stored in said second memory,
   a second circuit connected to said second common transmission path and said second memory, said second circuit stores microprogram, transferred through said second transmission path subsequent to recognizing an identification code of an associated module, in said second memory during a power-on sequence, and
   means connected to said first circuit, said second circuit and said second memory for sending said microprogram obtained from either said first circuit or said second circuit to said second memory.

2. A method for loading a microprogram in a second memory of a multiprocessor system including
   at least first and second modules each having,
   (a) a first processor for executing arithmetic processing and peripheral control,
   (b) a first memory for storing program and data wherein said program and data controls said first processor,
   (c) an input-output controller controlled by said controls external input-output devices,
   (d) a transmission controller controlled by said first processor wherein said transmission controller controls information transfers from/to another module, said transmission controller including a second processor for executing arithmetic processing and a second writable memory for storing microprogram wherein said microprogram controls said second processor,
   (e) a first common transmission path connected to said first processor, said first memory, said input-output controller and said transmission controller for permitting information transfers between said first processor, said first memory, said input-output controller and said transmission controller; and
   a second common transmission path respectively connected to transmission controllers of said modules for permitting information transfers between said first and second modules via said transmission controllers,
   said method comprising the steps of:
   storing, under control of said first processor, said microprogram in said second memory of said first module, said microprogram having been transferred to said transmission controller of said first module through said first common transmission path of said first module, said first module being in an initial state following a power-on sequence,
   starting up, under control of said first processor, said second processor of said first module; and
   storing, under control of said first processor, said microprogram in said second memory of said second module, said microprogram having been transferred from said first memory of said first module to said transmission controller of said second module through said first common transmission path of said module, said transmission controller of said first module and said second transmission path, said second module being in an initial state following a power-on sequence.

* * * * *